March 12, 1935. H. A. FARRAND 1,994,339
RULE
Filed April 19, 1932 2 Sheets-Sheet 1
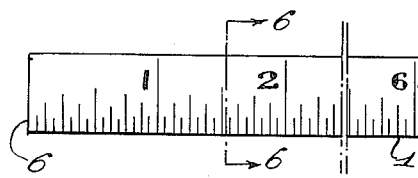
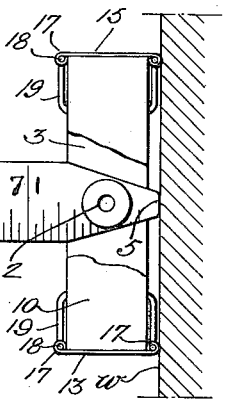
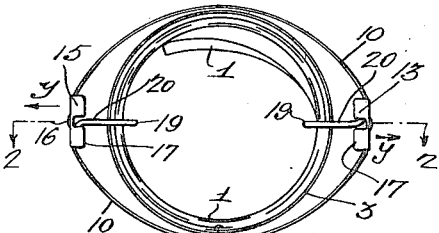
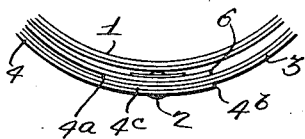
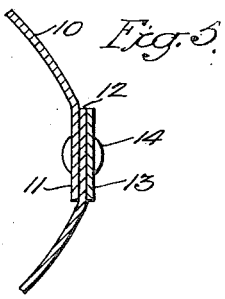
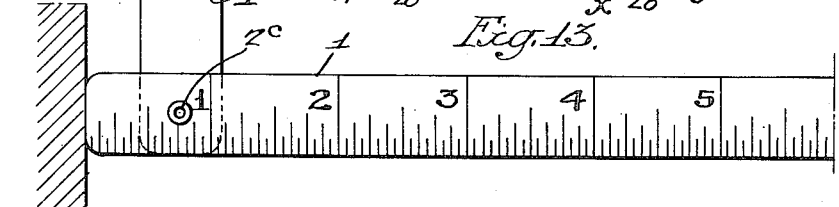
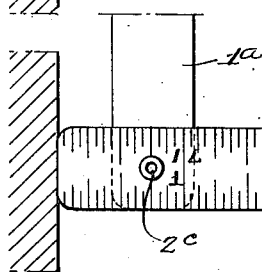
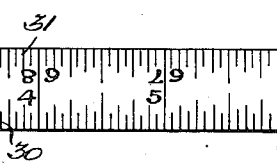
Inventor:
Hiram A Farrand
by his Attorneys
Howson & Howson March 12, 1935.  H. A. FARRAND  1,994,339
RULE
Filed April 19, 1932   2 Sheets-Sheet 2
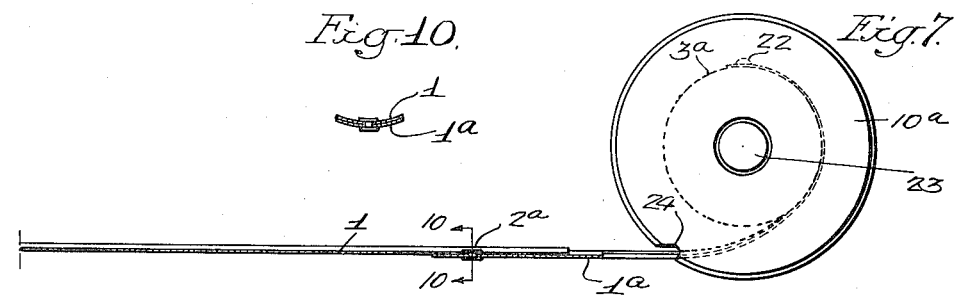
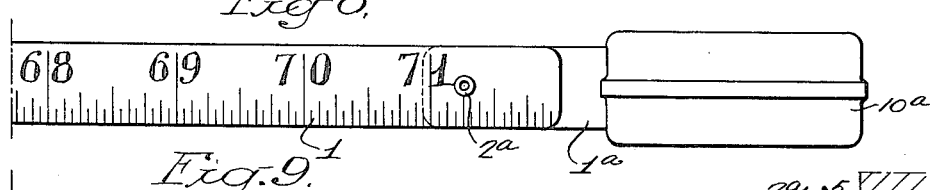
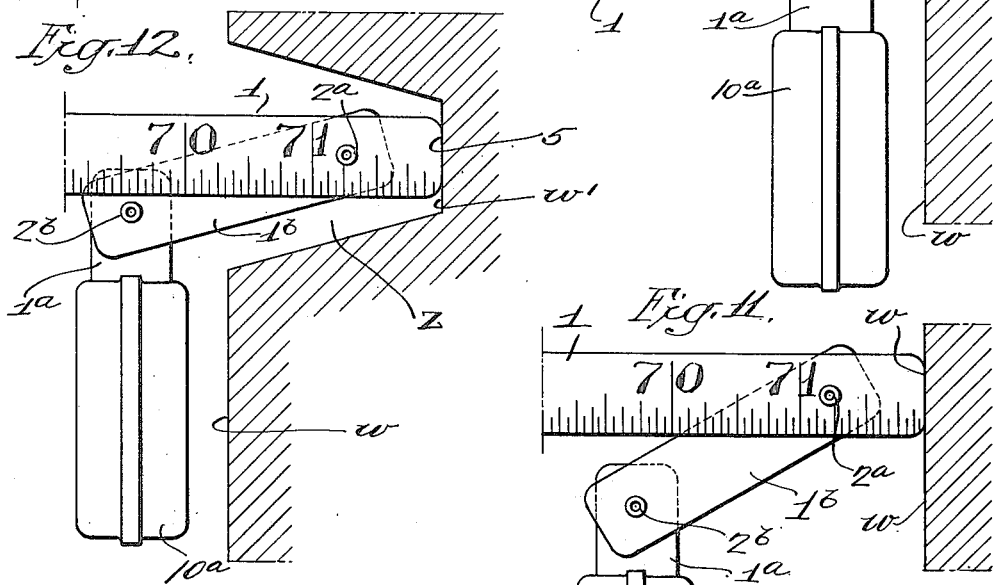
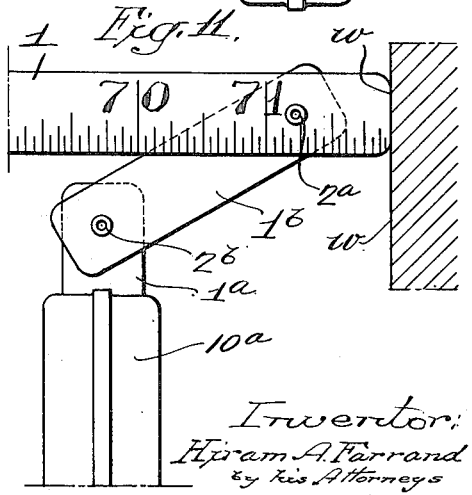
Inventor:
Hiram A. Farrand
by his Attorneys
Howson & Howson Patented Mar. 12, 1935

1,994,339

UNITED STATES PATENT OFFICE 1,994,339

RULE

Hiram A. Farrand, Berlin, N. H., assignor to Hiram A. Farrand, Inc., Berlin, N. H., a corporation of New Hampshire Application April 19, 1932, Serial No. 606,179

5 Claims. (Cl. 33—138)

This invention relates to measuring devices, and more particularly to those of the general types respectively disclosed in U. S. Letters Patent No. 1,402,589, illustrating a concavo-convex rule strip formed into an internally wound coil within a suitable holder, and No. 1,730,199, disclosing a concavo-convex rule strip formed into an externally wound coil on the outer peripheral surface of a suitable winding drum. The present invention, however, is not restricted to use with concavo-convex rule strips, as it is equally applicable to flat coilable rule strips.

Prior to the present invention concavo-convex rule strips, in many instances, have been completely removable from the winding or coiling apparatus, in order to take advantage of the entire length of the rule strip including both of the extreme opposite ends thereof, whereby either end of the rule strip may be used in abutting relation to an object up to or from which a measurement is to be made.

Complete detachment of the rule strip from its holder or winding apparatus has certain disadvantages, such for example as loss of the holder by dropping into inaccessible places or the holder being mislaid while the rule strip is in use.

In other instances, rule strips, both flat and concaved, are permanently secured at one end to the holder or winding apparatus and in such instances the end of the rule strip which is attached to the winding apparatus is not available for use in abutting relation to an object and all abutting measurements must therefore be made with the free end of the strip. There are times when it is desirable and more convenient to make an abutting measurement with that end of the rule strip which is attached to the holder and this is impossible with permanently attached rule strips of the prior art.

The primary object of the present invention is to permanently attach a rule strip to the device employed for reducing the strip into a compact form, such as a coil internally or externally wound, and in such a manner as to expose both ends of the rule proper for direct use in making successsive end to end measurements, and to permit the making of abutting measurements starting from either end of the rule.

In respect to the latter feature the present invention contemplates the provision of two independent scales extending respectively along the opposite longitudinal edges of the strip with the zero calibration of one scale and the maximum calibration of the other scale at each of the opposite ends of the strip respectively.

More specifically the object of the invention is to attach the rule strip to the holder or other winding device in such a manner that the holder may be readily moved from a position in normal coiling relation to the strip to a position out of coiling relation with the rule strip proper to expose both of the opposite ends of the rule strip proper for use simultaneously.

Another object of the invention is to provide a relatively simple inexpensive and light weight coiling apparatus in combination with the permanently attached rule strip, in order that such coiling apparatus will entail no inconvenience during the use of the rule strip.

Another object of the invention is to make the coiling apparatus of an extremely resilient and practically indestructible nature, whereby the relatively movable parts thereof will not become inoperative or relatively misplaced by dropping or by other hard usage of the device.

In the accompanying drawings:

Fig. 1 illustrates in side elevation a preferred form of the invention, illustrating a concavo-convex rule strip reduced to an internally wound coil;

Fig. 2 is a sectional plan view taken on the line 2—2, Fig. 1, with the rule strip in the fully coiled state;

Fig. 3 is a plan view illustrating the rule strip in its fully extended state, with a portion of the winding apparatus broken away and in such relation to the rule strip as to expose both ends of the rule strip proper and with the attached end of the strip in abutting relation to a substantially fixed object such as a wall;

Fig. 4 is an enlarged fragmentary view of the holder and wound coil at the point of attachment of the strip to the holder;

Fig. 5 is a detail sectional view of a portion of the winding apparatus illustrated in Figs. 1, 2 and 3;

Fig. 6 is a sectional view through the rule strip taken on the line 6—6, Fig. 3;

Fig. 7 is a side elevation partly in section of a rule strip permanently attached to the outer peripheral surface of a suitable winding drum for reducing the strip to an externally wound coil within a suitable enclosing outer casing;

Fig. 8 is a plan view of the apparatus as illustrated in Fig. 7;

Fig. 9 is a view similar to Fig. 8, but showing the winding and enclosing apparatus swung out of line of the rule strip for exposing both ends of the rule strip proper;

Fig. 10 is a transverse sectional elevation taken on the line 10—10, Fig. 7;

Figs. 11 and 12 respectively illustrate a modified form of the invention within the scope of the present invention;

Fig. 13 illustrates a rule strip attached to the winding apparatus adjacent the zero end of a one-way scale rule; and Fig. 14 is a view similar to Fig. 13 illustrating a two-way scaled rule with the rule strip attached at one of its ends to the winding apparatus.

As illustrated in Figs. 1 to 6 inclusive, the preferred form of the invention comprises a rule strip or blade 1 of the concavo-convex cross-sectional type, having an inherent tendency to assume a relatively stiff rectilinear state at all times.

The rule strip 1 is pivotally attached adjacent and inwardly from one end thereof, by means of a rivet or the like as illustrated at 2, to a suitable holder 3 which preferably is composed of one or more substantially concentric layers of a relatively thin, highly resilient metal strip 4, such as high carbon steel, with the opposite ends of the strip secured together, as illustrated in Figs. 1 to 4, to provide a resilient annulus constituting the holder 3 for the rule blade 1.

As shown in Figs. 1 and 4, the opposite ends 4a and 4b, and the intermediate layer 4c of the holder strip 4 are secured together by the rivet 2 which also provides the pivotal attachment for the one end 5 of the rule strip 1 with the holder 3.

The holder 3 with the rule strip 1 in coiled form, as in Fig. 1, is freely rotatably mounted within an outer carrier 10 which in the present instance consists of a strip of highly resilient metal similar to that of which the rule strip 1 and the holder or annulus 3 is composed, the strip forming the outer carrier 10 being bent to a substantially elliptical form, within which the holder 3 is mounted, the opposite ends 11 and 12 of the carrier strip 10 being in overlappng relation to each other at one end of the said carrier and secured together and to an end plate 13 by means of rivets 14, 14.

Secured to the opposite end of the carrier 10 in diametrically opposed relation to the plate 13 is a similar plate 15 connected to the carrier strip 10 as by rivets 16, 16.

At and beyond the opposite substantially parallel sides of the carrier 10 the plates 13 and 15 respectively are provided with bosses 17, 17 in which are secured the opposite ends 18, 18 of bridge elements or wires 19, 19 which are provided with side arms 20, 20 that project toward the center of the apparatus at and substantially parallel to the opposite sides respectively of the outer carrier 10, the holder 3 and the coiled strip 1, thereby confining the holder 3 and the coiled strip 1 to rotation within the plane of the carrier 10.

The inner ends of the arms 20, 20 of the bridge elements 19 are connected by cross members 21, 21 which pass transversely through the apparatus within the innermost convolution of the coiled rule strip 1, and impinge upon the said inner convolution of the coiled rule strip 1 at the points x, x, thereby acting as a brake to prevent relative rotation between the coiled strip 1, the holder 3 and the outer carrier 10, whereby the rule strip will be maintained in any predetermined state of coiling. The inherent resiliency of the outer carrier 10 tends to elongate and correspondingly narrow the carrier and thereby moves the bridge elements 19, 19 in opposite directions radially with respect to the center of rotation of the holder 3 in the direction of the arrows y, y, Fig. 1 into braking contact with the inner convolution of the coiled rule 1, or into braking contact with the inner surface of the annulus 3 when the rule strip 1 is fully extended as in Fig. 3.

Coiling and uncoiling of the rule strip 1 is accomplished in substantially the same manner as disclosed in the first of the above-mentioned Letters Patent, the side arms 20, 20 and the cross member 21 of either of the bridge elements 19, 19 cooperating with the holder 3 to reduce the rule strip into a compact internally wound coil, as in the first of the above-mentioned Letters Patent. The brakes as constituted by the bridge elements 19, 19 are released during the coiling and uncoiling of the rule strip by exerting inward pressure on the end plates 13 and 15 toward the center of the device whereby the bridge elements are released from the rule strip, the outer carrier 10 being reduced lengthwise and expanded crosswise, from the state illustrated in Fig. 1, to permit relative free rotation between the holder 3 and the carrier 10.

The pivotal connection afforded by the rivet 2 between the end 5 of the rule strip 1 and the annulus or holder 3 permits the winding apparatus, including the holder 3 and the outer carrier 10, to be turned from a normal coiling relation relative to the rule strip 1 to a position substantially at 90° to the rule strip 1 as illustrated in Fig. 3, whereby the free end 6 and the attached end 5 of the rule strip 1 are exposed for making a series of end to end measurements or whereby the attached end 5 of the rule strip 1 may be abutted against an object such as a wall w (see Fig. 3) without interference from the coiling apparatus, it being noted that the end 5 of the rule strip extends at least to the plane or beyond the plane of the outermost edge of the coiling apparatus when said coiling apparatus is turned at right angles to the rule strip 1 in the manner illustrated in Fig. 3.

In Figs. 1, 2 and 3, it will be noted that the rule strip is attached adjacent the end 5 thereof directly to the holder or cylindrical coiling element 3 whereas in the form of the invention shown in Figs. 7, 8, 9 and 10 the rule strip 1 is attached at 2a to one end of a supplementary strip 1a, which preferably is of the same general character as the rule strip 1, the rule strip 1 and the supplementary strip 1a being both of a concavo-convex nature in cross section whereby the two strips will longitudinally interlock with each other, as illustrated in Figs. 7 and 10, and whereby the supplementary strip 1a and the rule strip 1 form a substantially continuous element.

The opposite end of the supplementary strip 1a is rigidly secured, as at 22, to the outer peripheral surface of a cylindrical coiling element such as a winding drum 3a, which is rotatably mounted within an outer carrier or enclosing casing 10a, in any suitable manner forming no part of the present invention, the drum 3a being adapted to be rotated within the casing 10a to rewind the coil strip 1 and the supplementary strip 1a as a continuous element by any suitable means, such as a crank extending outside the outer casing 10a or by a torsional spring of the clock type wound within the drum 3a and having sufficient strength to rewind the strips 1, 1a against their inherent tendency to assume a rectilinear state, such winding being under control of a brake of any suitable nature under control of a button 23, all of which forms no part of the present invention and therefore is not illustrated in detail in the present drawings, it being sufficient to state in the apparatus shown in Fig. 7 that by holding the casing 10a in one hand with the free end 6 of the rule strip 1 projecting through an opening 24 in the casing 10a the projecting end of the rule strip may be gripped by the fingers of the other hand and be drawn out of the casing against the action of the rewinding spring, which would become effective to rewind the strip 1 upon pressing of the control button 23. In the case of the drum being rotated to rewind the strip 1a against its inherent tendency to assume a rectilinear state, by a suitable crank, pressing of the button 23 would release the drum 3a and permit the rule strip to extend itself from out of the casing 10a through the opening 24 thereof to be rewound by turning of the crank and consequently the drum 3a in an opposite direction when desired to rewind the rule on the drum 3a.

As illustrated in Fig. 9, the casing 10a may be moved out of coiling relation to the rule strip 1 by turning the supplementary strip 1a about the pivot 2a, by which the said supplementary strip is pivotally secured to the rule strip 1, to a position substantially at right angles to the rule strip 1.

In Figs. 11 and 12, the rule strip 1 is pivotally attached at 2a to an intermediate strip 1b which in turn is pivotally connected at 2b to one end of the supplementary strip 1a, the opposite end of which is secured to the winding apparatus in substantially the same manner as disclosed above, the intermediate strip 1b being of the same general character as the strips 1 and 1a and arranged to be aligned therewith and locked in such alignment by the similar concaved construction of the strips in the manner illustrated in Fig. 10.

Fig. 12 illustrates the end 5 of the rule strip 1 as being inserted within a cavity $z$ and abutting against the base $w^1$ thereof, relative pivotal movement between the strips 1, 1a and 1b permitting the elements to be folded in such a manner with respect to each other as to permit of the projecting of the rule strip into the cavity while the winding apparatus remains outside the cavity beyond the surface $w$ from which the cavity extends.

Fig. 13 illustrates that end of the rule strip 1 having the zero end of the scale thereon as being pivotally attached at 2c to the winding apparatus, either directly to the annulus or holder 3, to a supplementary strip 1a or to an intermediate strip 1b through which the rule strip would be permanently attached to the winding apparatus as above noted.

Fig. 14 illustrates a double-scale rule having one scale 30 along one longitudinal edge thereof and reading consecutively from zero upwardly toward the right as viewed in said figure, with a second scale 31 along the opposite edge of the rule strip with the maximum scale reading adjacent the end of the rule strip at which the zero reading of the scale 30 is disposed. The double-scale rule strip shown in Fig. 14 is pivotally connected at 2c to the winding apparatus in substantially the same manner as disclosed with respect to Fig. 13.

Obviously, the double-scale marking may be applied to the rule strip, such as that shown in Fig. 13, but with the second scale on the reverse face of the rule with the calibrations immediately underlying the calibrations shown in Fig. 13 and with maximum scale characters such as 71, 70, 69, etc. of the reverse scale immediately underlying the minimum scale characters 1, 2, 3 etc. respectively as shown in Fig. 3.

I claim:
1. The combination of a relatively stiff coilable rule strip capable of withstanding a substantial longitudinal compression strain without buckling having a scale extending from end to end thereof, a coiling element for and normally in coiling relation to the rule strip having substantially the same requisite stiffness as the rule strip, and a supplementary strip normally aligned with the rule strip and having one end pivotally attached to one end of the rule strip with the opposite end of the supplementary strip permanently secured to the coiling element.

2. The combination of a coilable rule strip having a scale extending from end to end thereof, a coiling element for and normally in coiling relation to said rule strip, a supplementary strip having one end permanently secured to said coiling element, and an intermediate strip normally aligned with the rule strip and the supplementary strip and pivotally attached at its opposite ends to said strips respectively.

3. The combination of a relatively stiff coilable rule strip capable of withstanding a substantial longitudinal compression strain without buckling having independent progressively increasing measuring scales along the opposite longitudinal edges thereof respectively and each extending from end to end of the rule strip with the lower end, of one scale and the higher end of the other scale at each of the opposite ends of the rule strip, coiling means for and normally in coiling relation to the rule strip, and means permanently attaching one end of the rule strip to the coiling means in a manner providing for pivotal movement of the coiling means about an axis perpendicular to the strip into a position out of said normal coiling relation to the rule strip for exposing the scales at the attached end of the rule strip for measuring usage.

4. The combination of a relatively stiff coilable rule strip capable of withstanding a substantial longitudinal compression strain without buckling having a plurality of progressively measuring scales extending respectively from end to end of the rule strip with the lower end of one and the higher end of another of said scales disposed at each end of the strip, coiling means for and normally in coiling relation to the rule strip, and means permanently attaching one end of the strip to said coiling means and providing for pivotal movement of the coiling means in the plane of the strip to a relatively laterally extending position out of said coiling relation to the strip.

5. The combination of a relatively stiff coilable rule strip capable of withstanding longitudinal compressive thrust without buckling and having a scale extending from end to end thereof, correspondingly stiff coiling means normally in and movable from coiling relation to said rule strip, and means permanently securing said coiling means to said rule strip inwardly from one end thereof against relative linear movement therebetween under said thrust and affording relative pivotal movement therebetween to permit moving of said coiling means to its non-coiling position for exposing the opposite ends of the rule strip for measuring usage.

HIRAM A. FARRAND.